UNITED STATES PATENT OFFICE.

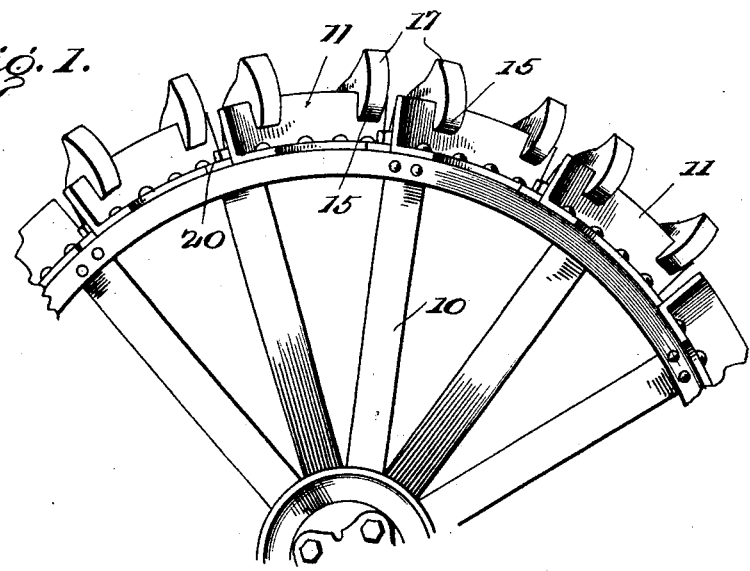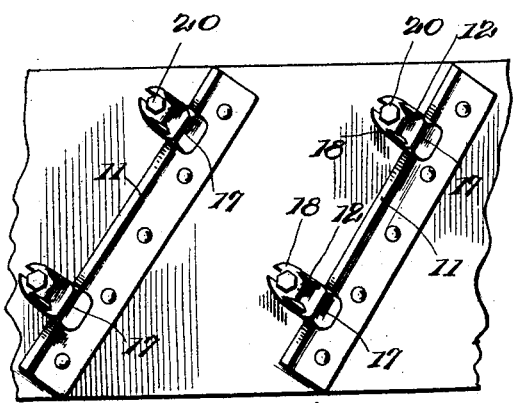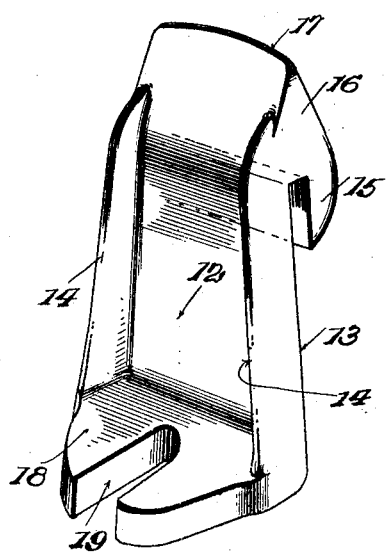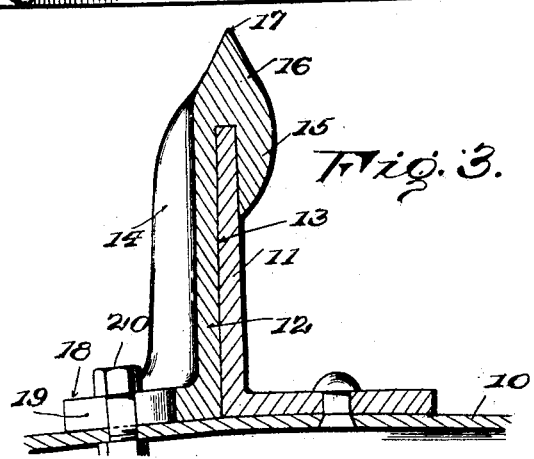

FRANK R. DANIELSON, OF FAIRFIELD, IOWA.

ICE-LUG.

1,399,198.    Specification of Letters Patent.    Patented Dec. 6, 1921.

Application filed March 9, 1920. Serial No. 364,555.

*To all whom it may concern:*

Be it known that I, FRANK R. DANIELSON, a citizen of the United States, residing at Fairfield, in the county of Jefferson and State of Iowa, have invented certain new and useful Improvements in Ice-Lugs, of which the following is a specification.

This invention relates to an improved ice lug for tractors, being particularly designed for use in connection with light farm tractors for preventing slipping of the drive wheels thereof when passing over ice or frozen ground.

The invention has as a further object to provide a device which may be readily applied and as easily removed, a single fastening only being employed in connection with each device.

A still further object of the invention is to provide a device formed to coact with the cleats of the drive wheels in such manner that the cleats will serve, in conjunction with the fastening for said devices, to rigidly sustain the lugs to project radially from the periphery of the drive wheels.

And the invention has as a still further object to provide a device of such nature that a pair of the lugs may be engaged with each of the drive wheel cleats to the end that the several lugs of each wheel will be disposed with respect to each other in such manner as to overcome any undesirable jolting or jarring which would otherwise be incident to the presence of the lugs upon the drive wheels.

Other and incidental objects will appear hereinafter.

In the drawings:

Figure 1 is a fragmentary side elevation showing a tractor drive wheel equipped with my improved ice lug, Fig. 2 is a plan view showing the arrangement of the lugs with respect to each other, Fig. 3 is a fragmentary vertical section taken medially through the device, and Fig. 4 is a perspective view showing the lug in detail.

In order that the construction, mounting and operation of my improved ice lug may be accurately understood, I have, in the drawings, shown the device in connection with a conventional type of tractor drive wheel 10. Secured to the periphery of the wheel are the usual circumferentially spaced cleats 11, these cleats being in the nature of ordinary angle plates arranged diagonally of the wheel rim. As is well known, considerable trouble is at present experienced in the operation of light farm tractors during the winter months by reason of the fact that such tractors are not of sufficient weight to sink the long cleats of the drive wheels thereof into the ice or frozen ground with the result that the drive wheels slip. Accordingly, the present invention seeks to provide a device which will present a relatively short sharp traction edge so that, when applied to the drive wheel of a light tractor, the weight of the tractor will be sufficient to sink said edge into the ice or frozen ground for affording efficient traction for the drive wheels.

In carrying the invention into effect, my improved lug is formed with a body 12 having a flat inner side face 13 and reinforced at its outer side by vertical ribs 14 arranged at the side edges of the body. As will be observed, the body is tapered from its lower end toward its upper end and formed on the upper end of the body is a hook, the bill 15 of which confronts the flat face 13 of the body in spaced parallel relation. Rising from the back of the hook at the upper end of the body is a substantially wedge-shaped rib 16 having its forward side face merging into the front face of the hook bill and its rearward side face merging into the rear face of the body, this rib providing a relative short traction edge 17 at the upper end of the body. Projecting forwardly from the lower end of the body is a supporting base 18 in which is medially formed a slot 19 and, as will be observed, the flat lower face of the base lies flush with the lower end of the body.

In equipping a tractor wheel with the improved lug, a pair of the lugs is, as shown in the drawings, preferably employed in connection with each of the cleats 11. In applying the lugs, the hooks thereof are engaged over the cleats so that the flat faces 13 of the bodies of the lugs will thus rest against the front faces of the cleats. Bolts or other approved fastenings 20 are then engaged through the slots 19 of the lug bases 18 and through the wheel rim for securing the devices in position, the wheel rim being provided, of course, with openings adjacent opposite ends of each of the cleats for receiving said bolts. As will be seen, the hook bills 15 of the ice lugs will serve to retain the flat faces 13 thereof seated against the front faces of the cleats 11, so that wabbling of the lugs will be prevented while the cleats will effectually coact with the bolts 20 for rigidly supporting the lugs in upstanding position, it being observed that but a single fastening device is employed in connection with each lug so that, when desired, the lugs may be readily mounted upon the wheel or as easily removed therefrom. By employing a pair of the lugs in connection with each of the cleats, the circumferential spacing of successive lugs will be close enough to prevent any undesirable jarring or jolting while, at the same time, the lugs will be brought into individual engagement with the ground. In this connection, it will be observed that the traction edges 17 of the lugs, being, as compared with the length of the cleats, relatively short, will readily sink into the ground to provide effective traction for the drive wheels.

Having thus described the invention, what is claimed as new is:

1. The combination with a vehicle wheel having a cleat projecting from its periphery, of an ice lug seating against the cleat and provided with means engaging thereover for securing the lug to the cleat, and fastening means coacting between the lug and the wheel rim for securing the lug thereto.

2. An ice lug including a body formed at its outer end portion with a hook to engage with a wheel cleat and provided at its inner end with a base disposed to seat against a wheel rim supporting the lug and formed to coact with a fastening device securing the lug to the wheel rim whereby said fastening device will relieve the cleat of shearing stress upon the lug.

In testimony whereof I affix my signature.

FRANK R. DANIELSON. [L. S.]